Aug. 28, 1962

G. ALFIERI 3,051,199

ANTICLOGGING DEVICE PARTICULARLY FOR
CALIBRATED HOLES IN PNEUMATIC PIPE
FITTING OF MOTOR VEHICLES

Filed May 14, 1959

INVENTOR.
GIUSEPPE ALFIERI

BY Harold T. Stowell
Harold L. Stowell

ATTORNEYS

United States Patent Office 3,051,199
Patented Aug. 28, 1962

3,051,199
ANTICLOGGING DEVICE PARTICULARLY FOR CALIBRATED HOLES IN PNEUMATIC PIPE FITTING OF MOTOR VEHICLES
Giuseppe Alfieri, Milan, Italy, assignor to Fabbrica Italiana Magneti Marelli S.p.A., Milan, Italy, a firm
Filed May 14, 1959, Ser. No. 813,277
Claims priority, application Italy May 24, 1958
2 Claims. (Cl. 138—44)

The present invention refers to an anticlogging device for calibrated holes, and particularly to such devices used in pressurized fluid systems of motor vehicles.

It is well known that in pressure fluid systems in general and in pressurized fluid systems of motor vehicles clogging occurs frequently.

Calibrated holes of very small diameter or size are often clogged or restricted by impurities that are generally present in the fluids passing through the holes.

The present invention has for its object means to prevent clogging of calibrated holes that are simple in form and inexpensive to manufacture.

The device according to the invention is characterized in that the continuity of the flow through a calibrated hole is provided by movement therein of a suitable anticlogging member that is responsive to vibrations of the means, such as a vehicle, on which the device is mounted.

The advantages and features of the invention will be specified herebelow with reference to the accompanying drawing showing by way of example a preferred invention embodiment or application.

Figure 1:
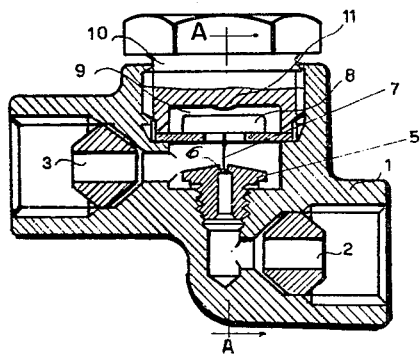
FIG. 1 is a side view in partial section of a three way pipe fitting with a calibrated passage therein that is provided with the anticlogging device of the invention.
Figure 2:
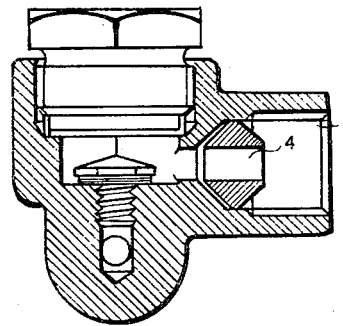
FIG. 2 is a sectional view of said device along the line A—A of FIG. 1.

In the device as shown in FIGS. 1 and 2 the body of the pipe fitting of flow restricting device is indicated with the numeral 1. 2 is the fluid inlet port and 3—4 are the fluid outlet ports.

The connection between the fluid inlet port 2 and the delivery ports takes place through a restricted section, provided with a nozzle means 5 having a calibrated opening 6 therethrough.

Longitudinal sliding motion of an anticlogging member 7, preferably made of stainless steel and needle shaped, can easily take place inside of said hole 6 in nozzle means 5.

The member 7 extends through the hole 6 in nozzle 5 and is held at the top by a mass 8 that is arranged in a suitable housing 9 provided in the closure plug 10.

The housing 9 is of such a size as to allow free motion of the mass 8 therein, whereby if the device is fitted to a vehicle, the mass 8 bounces and moves as the vehicle vibrates causing a corresponding axial and angular motion of the anticlogging member 7 carried thereby.

Automatic and efficient cleaning of the hole is brought about by the particular motion of the mass 8, which can be moved in an axial direction and also in a plane at a right angle thereto as well as rocking on the curved projection 11 protruding from the upper wall of housing 9.

Figure 3:
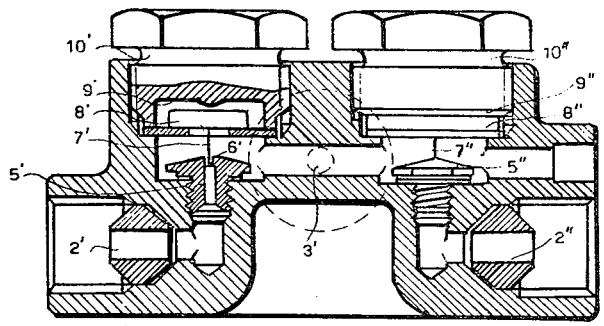
FIG. 3 is a view in partial section of a three way pipe fitting with a pair of calibrated passages therein.
Figure 4:
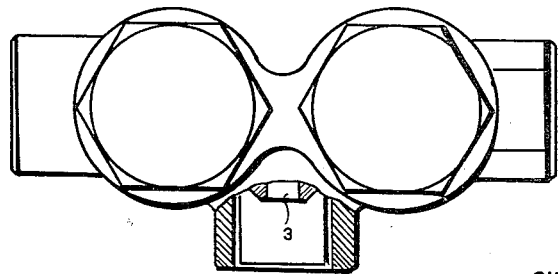
FIG. 4 is a top plan view in partial section of the device shown in FIG. 3.

The FIGURES 3 and 4 show the application of the anticlogging device applied to a pipefitting provided with a pair of calibrated passages.

Fluid delivery is through an inlet 2' and the nozzle 5' provided with a calibrated hole 6' and through the inlet 2" and the nozzle 5" also provided with a calibrated hole.

7', 7" and 8', 8" are respectively the anticlogging needle members and the masses secured thereto, that are arranged in the housings 9' and 9" provided in the closure plugs 10' and 10" respectively.

I claim:
1. A flow restricting device adapted to be mounted on a movable member, a fluid inlet and a fluid outlet in said device, a passage in the device connecting the fluid inlet and the fluid outlet, a restricting nozzle member having a restricted passage therethrough provided in said passage in said device, an elongated needle like member projecting through the restricted passage in the nozzle, said elongated needle like member having a thickness in a direction transverse to the restricted passage in the nozzle substantially less than the size of the said restricted passage, a freely movable inertial member secured to one end of the elongated needle like member, an opening in said device aligned with said needle like member, a plug in said opening, and a housing for the inertial member in said plug, the interior dimensions of said housing being substantially greater than the dimensions of the inertial member whereby movement of the movable member vibrates said inertial member to move said needle like member within the restricted opening in the nozzle and maintain said restricted passage in the nozzle open.

2. The invention defined in claim 1 wherein the housing is provided with a projection having a curved surface upon which the inertial member may rock.

References Cited in the file of this patent
UNITED STATES PATENTS

| | | |
|---|---|---|
| 685,652 | Smith | Oct. 29, 1901 |
| 1,661,150 | Birkenmaier | Feb. 28, 1928 |
| 1,937,555 | Estler | Dec. 5, 1933 |
| 2,304,456 | Hall | Dec. 8, 1942 |
| 2,423,960 | Bucknell et al. | July 15, 1947 |
| 2,533,907 | Anderson | Dec. 12, 1950 |